(12) United States Patent
Hsiung

(10) Patent No.: US 8,522,965 B1
(45) Date of Patent: Sep. 3, 2013

(54) SUPPORTIVE PROTECTIVE COVER FOR A HANDHELD DEVICE

(71) Applicant: Chih-Hao Hsiung, Taoyuan County (TW)

(72) Inventor: Chih-Hao Hsiung, Taoyuan County (TW)

( * ) Notice: Subject to any disclaimer, the term of this patent is extended or adjusted under 35 U.S.C. 154(b) by 0 days.

(21) Appl. No.: 13/726,228

(22) Filed: Dec. 24, 2012

(51) Int. Cl.
*B65D 5/52* (2006.01)
*B65D 25/24* (2006.01)

(52) U.S. Cl.
USPC .......................... 206/45.24; 206/320; 248/465

(58) Field of Classification Search
USPC ................... 206/320, 45.24, 45.26; 248/136, 248/150, 149, 465, 436, 450
See application file for complete search history.

(56) References Cited

U.S. PATENT DOCUMENTS

| | | | | |
|---|---|---|---|---|
| 1,189,531 A | * | 7/1916 | Bierwirth | 206/45.24 |
| 2,444,369 A | * | 6/1948 | Rentos | 248/450 |
| 2,542,958 A | * | 2/1951 | Babbitt | 248/463 |
| 2,636,702 A | * | 4/1953 | Brody | 248/465 |
| 4,905,821 A | * | 3/1990 | Corbett | 206/45.24 |
| 7,637,376 B2 | * | 12/2009 | Silva et al. | 206/579 |
| 8,173,893 B2 | * | 5/2012 | Huang | 136/251 |

* cited by examiner

*Primary Examiner* — Jacob K Ackun
(74) *Attorney, Agent, or Firm* — Chun-Ming Shih; HDLS IPR Services

(57) ABSTRACT

The protective cover includes a shell and a support assembly. A side of the shell is formed with a receiving room and the other side is provided with an installing portion and a connecting base. The support assembly includes a flexible support plate and a slider. The flexible support plate has a free section and a connecting portion extending from the free section and connecting with the installing portion. The slider is slidably connected to the connecting base and cloaks a part of the flexible support plate. The free section projects away from the shell when slider moves toward the connecting portion.

5 Claims, 8 Drawing Sheets

SUPPORTIVE PROTECTIVE COVER FOR A HANDHELD DEVICE

BACKGROUND OF THE INVENTION

1. Technical Field

The invention relates to protective covers, particularly to protective covers for handheld devices.

2. Related Art

Handheld devices may be tablet PCs, smart phones, cell phones, etc. A handheld device may be used to take a picture, access data, make a phone call or process an electronic document, etc. A handheld device is a precision electronic apparatus and stores personal data therein. To prevent a handheld device from being collided and wearing away, usually a protective cover is used to cloak it. Additionally, some protective cover is provided with a support to make the handheld device be able to stand alone.

A typical supportive protective cover includes a shell and a support. A side of the shell is formed with a receiving room and the other side is pivotally connected by the support. The support can be lifted up to form an angle against the shell so that the handheld device can be put on a table and stand alone.

However, such a supportive cover has drawbacks as follows:

1. Although the support can be collapsed in the shell, the support will still protrude from the shell. This is inconvenient for storage.

2. The angle between the support and shell cannot be adjusted, thus the handheld device stands on a table only in a fixed angle.

3. When using the support, the angle between the support and shell must be confirmed, otherwise the handheld device tends to fall down.

SUMMARY OF THE INVENTION

An object of the invention is to provide a supportive protective cover for a handheld device, which can simply lift up the free section of the flexible support plate by sliding the slider. This is very convenient for users.

To accomplish the above object, the protective cover of the invention includes a shell and a support assembly. A side of the shell is formed with a receiving room and the other side is provided with an installing portion and a connecting base. The support assembly includes a flexible support plate and a slider. The flexible support plate has a free section and a connecting portion extending from the free section and connecting with the installing portion. The slider is slidably connected to the connecting base and cloaks a part of the flexible support plate. The free section projects away from the shell when slider moves toward the connecting portion.

The invention also has advantages as follows:

1. A handheld device can be protected by the shell.

2. Because the flexible support plate can be stored in the recess, the flexible support plate can be collapsed when it is not in use. This can reduce the volume of the protective cover.

3. The angle between the free section and bottom can be adjusted by adjusting a position of the slider. As a result, the shell can be supported with an adjustable angle.

4. While the slider is being moved, it can be guided by the guide member embedded into the guide slot to avoid deflection.

5. The connection of the flexible support plate and shell 10 is simply implemented by inserting the block into the engagement cavity. This is very easy for users.

DETAILED DESCRIPTION OF THE INVENTION

Figure 1:
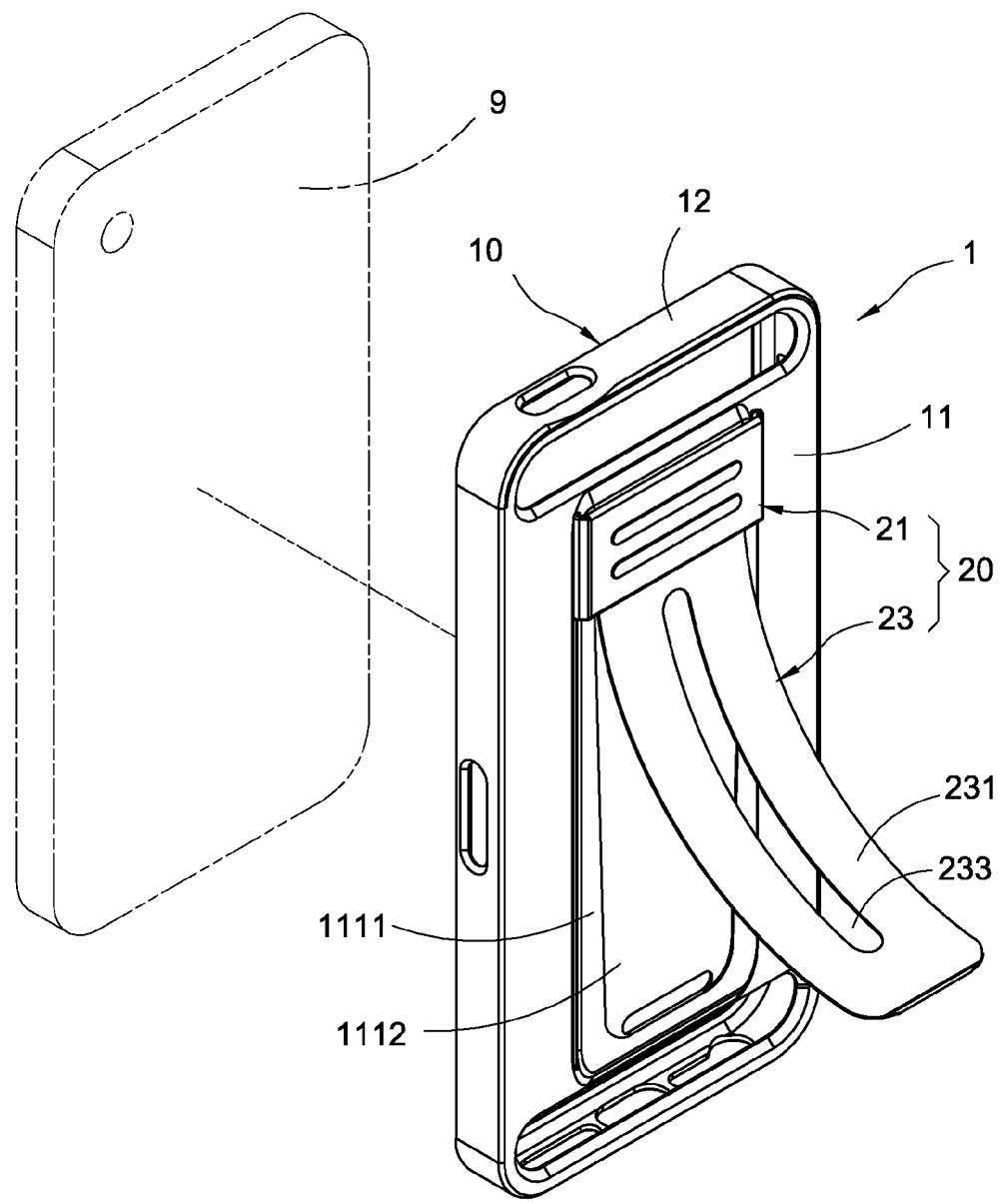
FIG. 1 is a schematic view of the invention.

Please refer to FIG. 1. The protective cover 1 of the invention includes a shell 10 and a support assembly 20.

Figure 2:
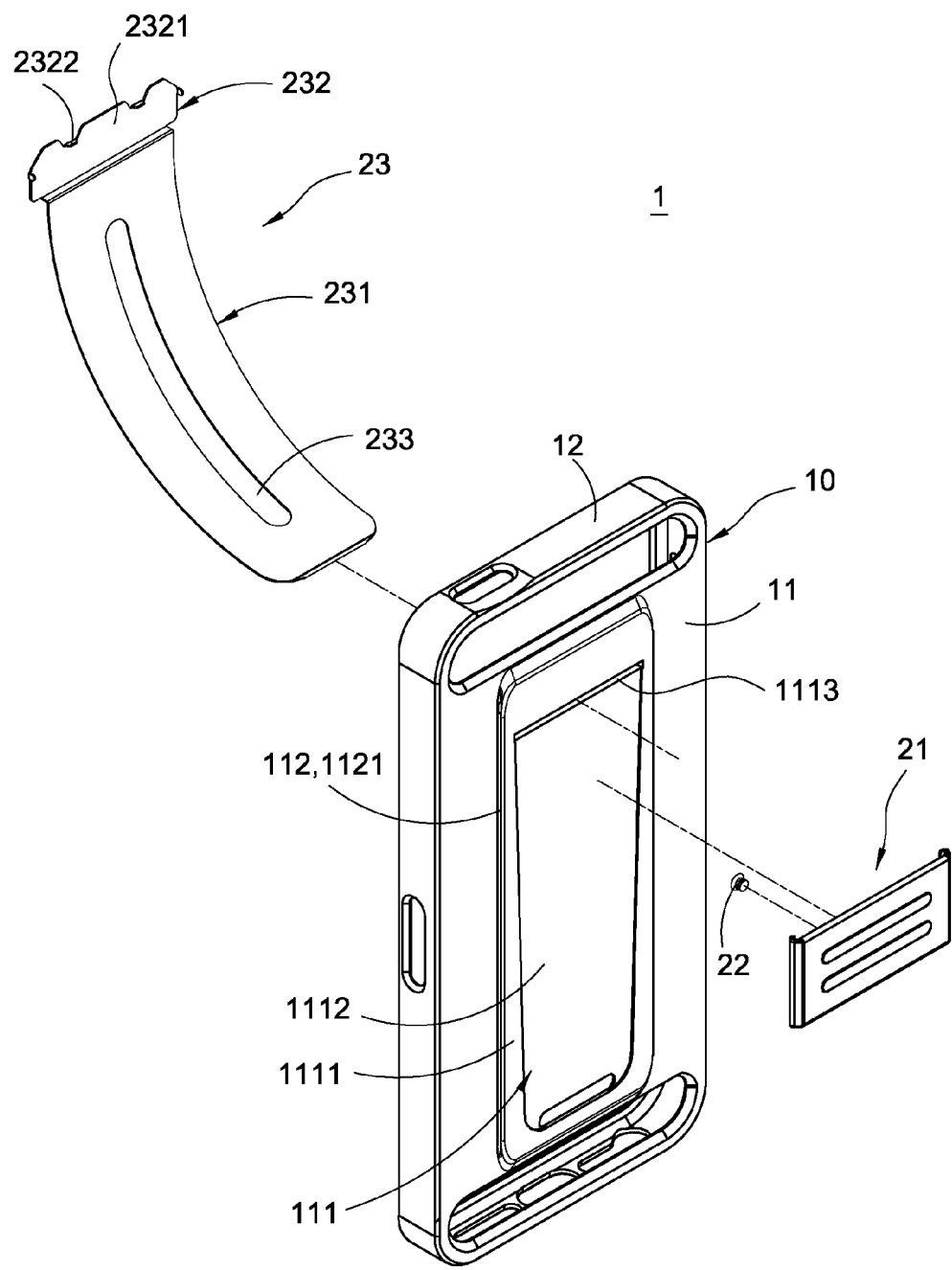
FIG. 2 is an exploded view of the invention.
Figure 3:
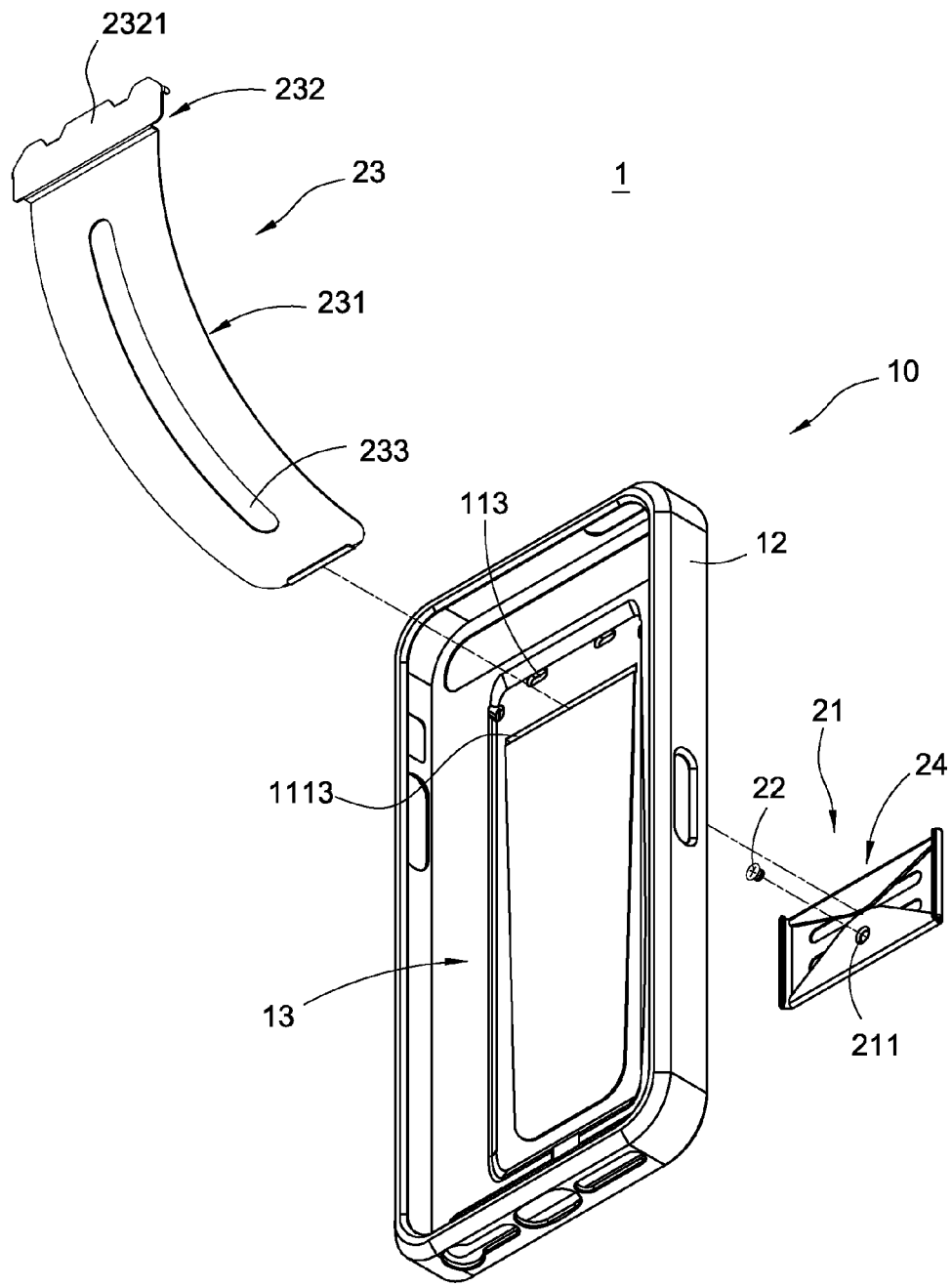
FIG. 3 is another exploded view of the invention.

Please refer to FIGS. 2 and 3. The shell 10 is composed of a bottom 11 and a surrounding wall 12 and a receiving room 13 is formed therein for receiving a handheld device 9. The back of the bottom 11 is formed with an installing portion 111 and a connecting base 112. The installing portion 111 has a protrusion 1111. A recess 1112 is formed in the middle of the protrusion 1111. The connecting base 112 is at least one sliding trough 1121 at a side of the protrusion 1111 and the sliding trough 1121 is located beside the recess 1112. The protrusion 1111 is formed with a through hole 1113 communicating with the receiving room 13. The through hole 1113 is located at a side of the recess 1113. A side of the receiving room 13 is formed with at least one engagement cavity 113 near the through hole 1113.

The support assembly 20 includes a slider 21, a guide member 22 and a flexible support plate 23.

The slider 21 is slidably connected to the sliding trough 1121. A gap 24 is formed between the slider 21 and protrusion 1111. The slider 21 is provided with a threaded hole 211.

The guide member 22 is a bolt and is screwed into the threaded hole 211. The slider 21 is adjacent to a side of the shell 10.

The flexible support plate 23 is inserted into the gap 24 so that the slider 21 cloaks a part of the flexible support plate 23. The flexible support plate 23 has a free section 231 and a connecting portion 232 extending therefrom. The connecting portion 232 is coupled with installing portion 111. The connecting portion 232 has a tongue 2321 with at least one block 2322. The tongue 2321 is inserted into the through hole 1113 to make the block 2322 located in the receiving room 13. The tongue 2321 is secured in the engagement cavity 113 through the block 2322 so as to connect with the bottom 11. The flexible support plate 23 is connected to the shell 10 by the connection of the connecting portion 232 and shell 10. Besides, the flexible support plate 23 is formed with a guide slot 233. The guide member 22 is slidably connected to the guide slot 233. The flexible support plate 23 is an arcked metal sheet. The free section 231 can project away from the shell 10 by moving the slider 21 toward the connecting portion 232.

Figure 4:
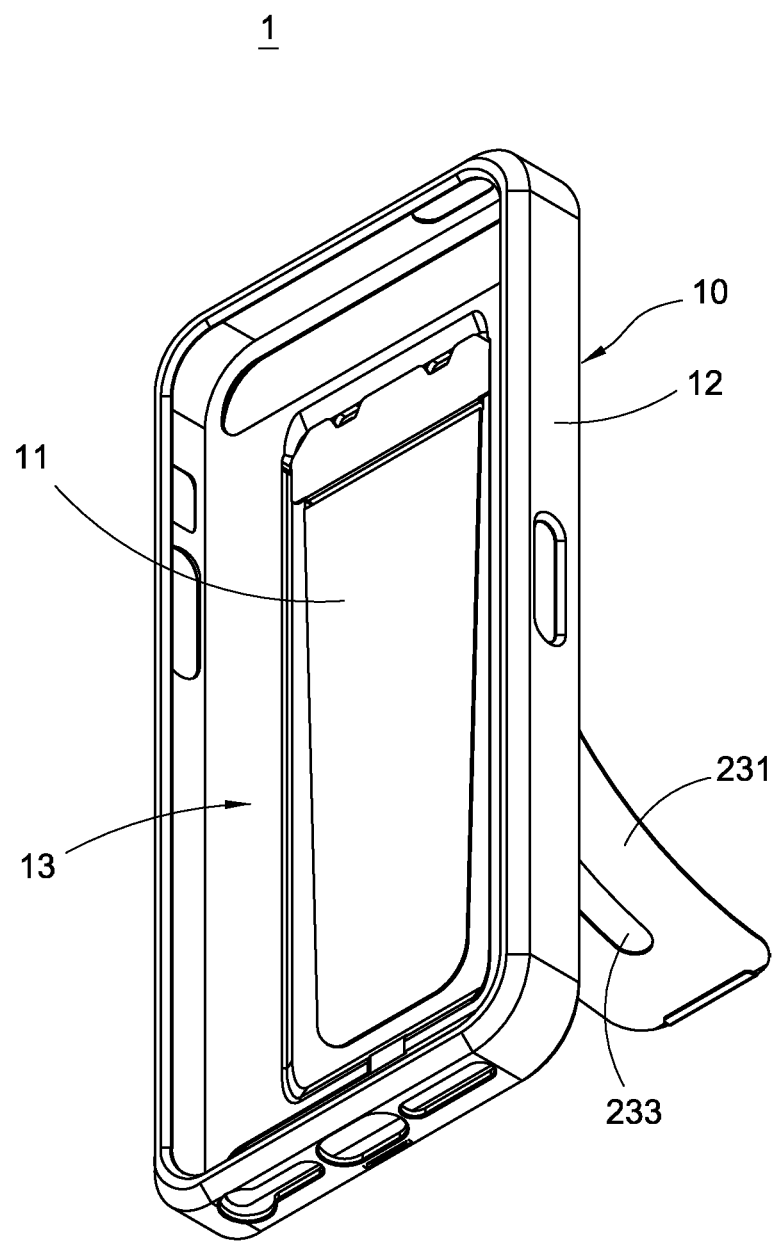
FIG. 4 is an assembled view of the invention.
Figure 5:
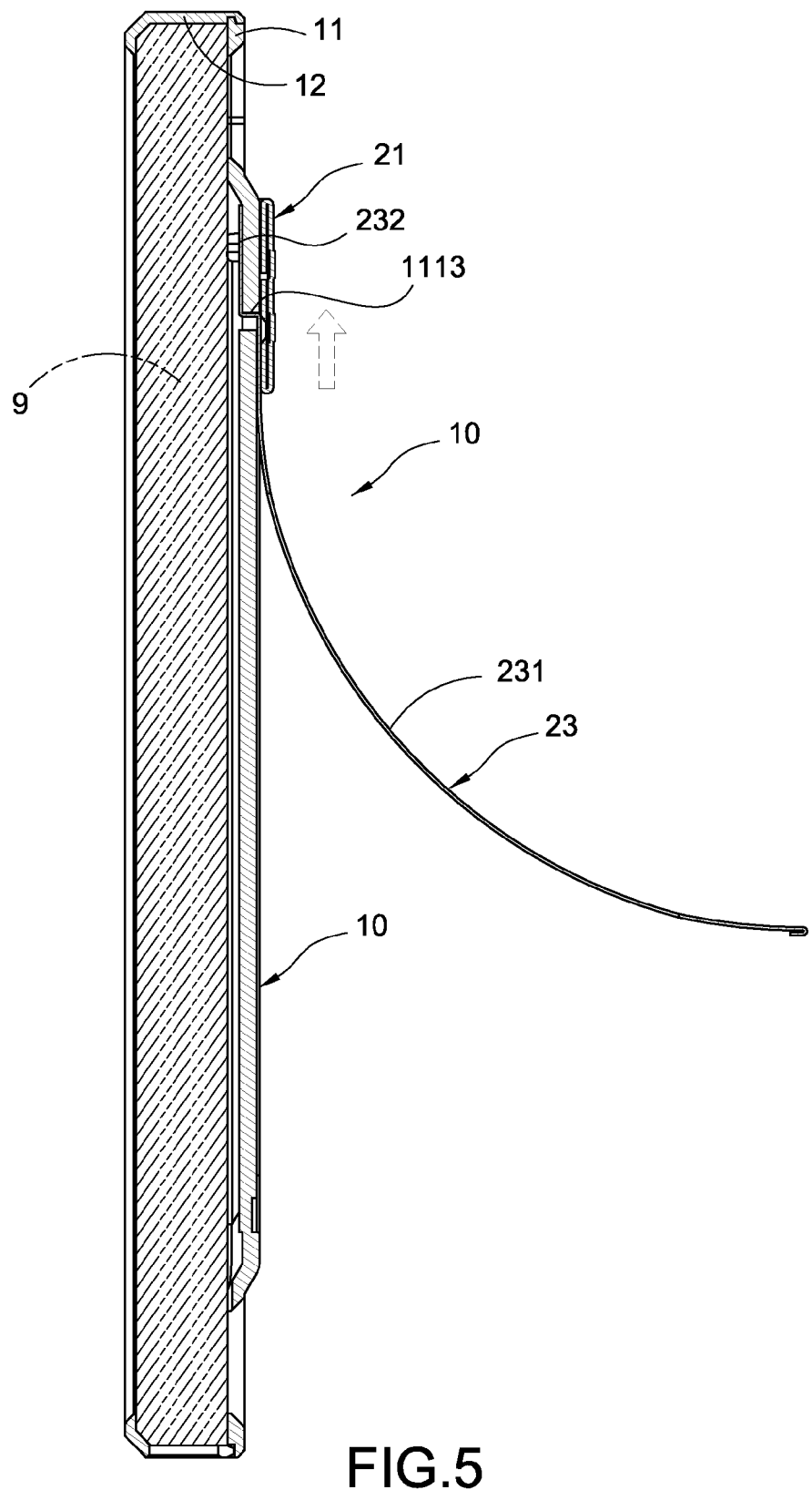
FIG. 5 is a schematic view of the invention in use.
Figure 6:
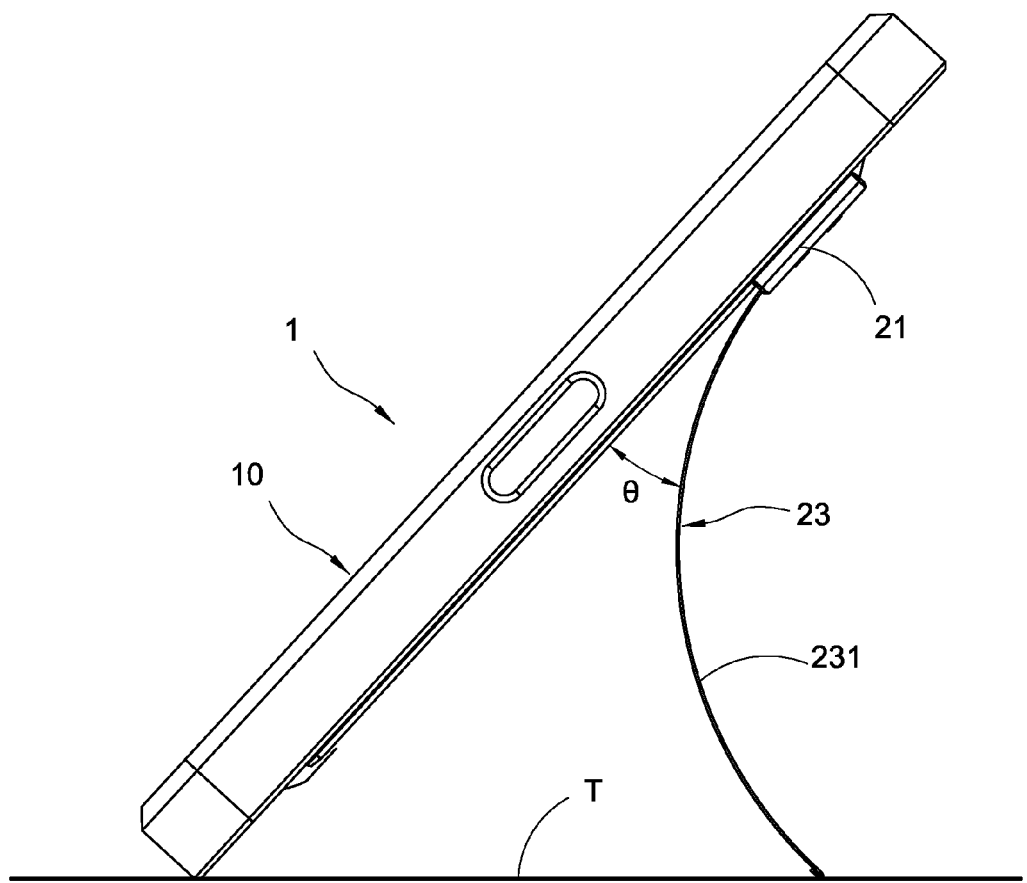
FIG. 6 is another schematic view of the invention in use.

Please refer to FIGS. 4-6. Because the flexible support plate 23 is an arcked metal sheet, the free section 231 can project away from the shell 10 by moving the slider 21 from the free section 231 of the flexible support plate 23 toward the connecting portion 232 of the flexible support plate 23. Thus an angle θ is formed between the free section 231 and bottom 11. When the protective cover 1 is put on a table T, the free section 231 can support the shell 10 to make the handheld device 9 stand alone.

Figure 7:
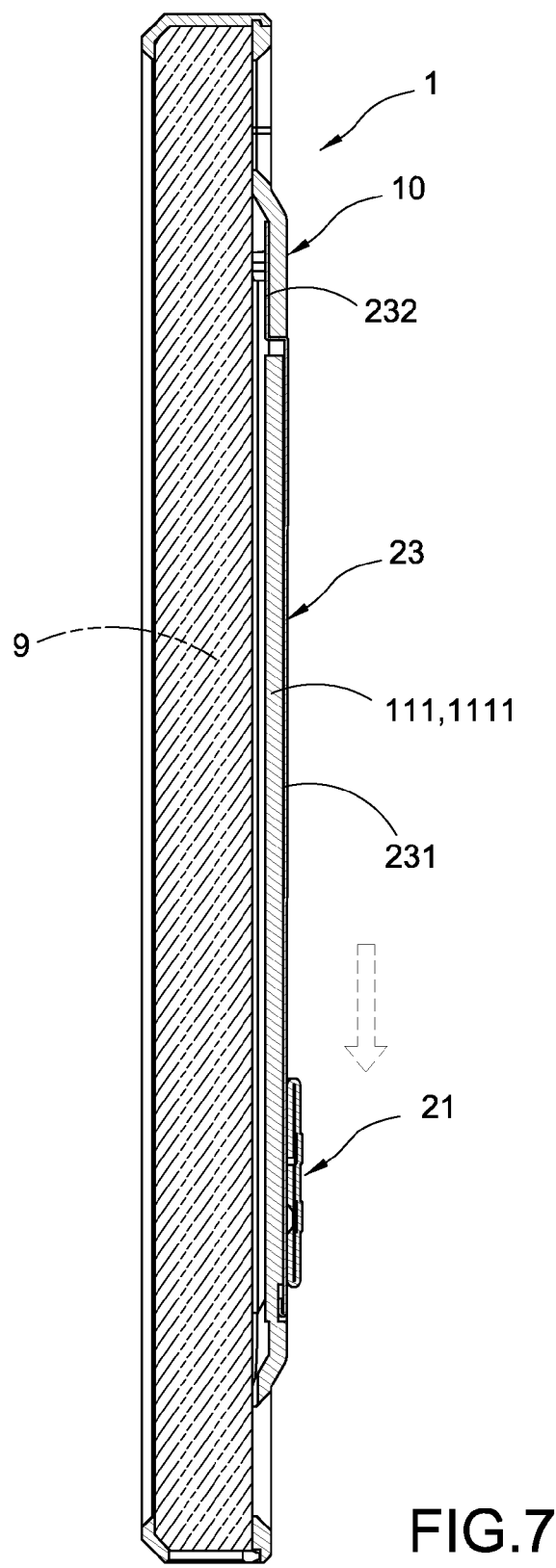
FIG. 7 is still another schematic view of the invention in use.
Figure 8:
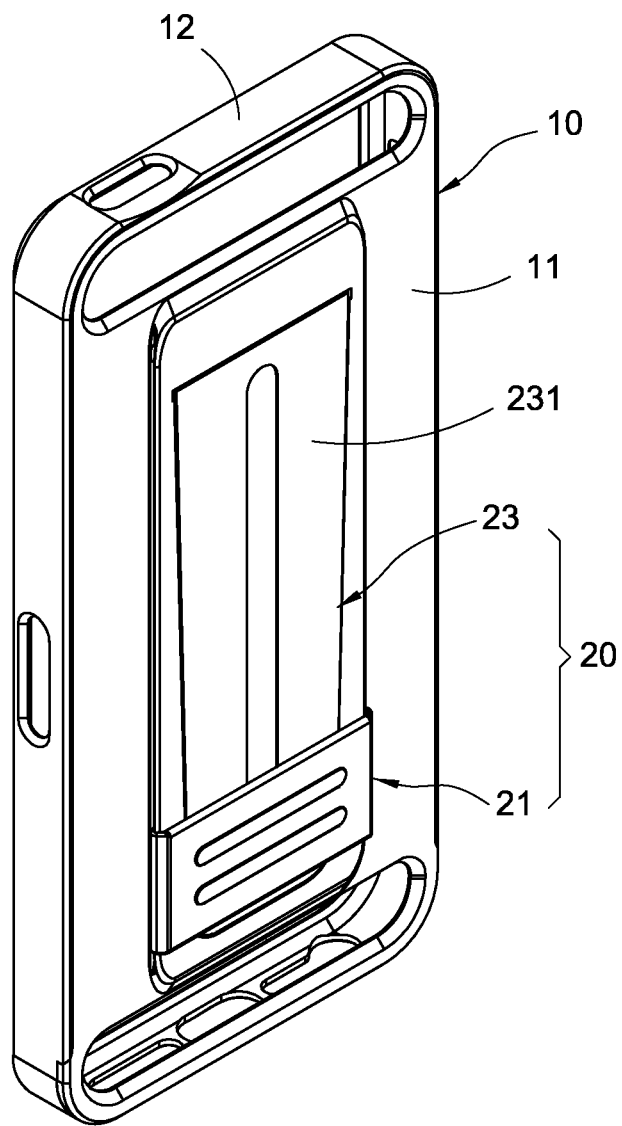
FIG. 8 is yet another schematic view of the invention in use.

Please refer to FIGS. 7 and 8. When the flexible support plate 23 is not needed to use, move the slider 21 from the connecting portion 232 toward the free section 231 to make the slider 21 press the free section 231 toward the bottom 11. Thus the free section 231 is located in the recess 1112, i.e. the flexible support plate 23 is collapsed.

While the slider 21 is being moved toward the connecting portion 232, the closer the slider 21 nears the connecting portion 232, the larger the angle θ is. Thus the angle θ can be adjusted by adjusting a position of the slider 21. As a result, the shell 10 can be supported with an adjustable angle.

Furthermore, while the slider 21 is being moved, it can be guided by the guide member 22 embedded into the guide slot 223 to avoid deflection.

Because the flexible support plate 23 can be stored in the recess 1112, the flexible support plate 23 can be collapsed when it is not in use. This can reduce the volume of the protective cover 1.

The connection of the flexible support plate 23 and shell 10 is simply implemented by inserting the block 2322 into the engagement cavity 113. This is very easy for users.

It will be appreciated by persons skilled in the art that the above embodiment has been described by way of example only and not in any limitative sense, and that various alterations and modifications are possible without departure from the scope of the invention as defined by the appended claims.

What is claimed is:

1. A protective cover for a handheld apparatus, comprising:
   a shell including a bottom and a surrounding wall, a side of the bottom being formed with a receiving room enclosed by the surrounding wall, and the other side of the bottom being provided with a protrusion extending from the bottom, wherein a through hole communicating with the receiving room is formed on the protrusion and two sliding troughs are formed on two opposite sides of the protrusion; and
   a support assembly comprising:
      a flexible support plate disposed on the protrusion, having a free section and a connecting portion extending from the free section and passing through the through hole to be secured on an inner surface of the protrusion; and
      a slider, slidably connected to the two sliding troughs, and cloaking a part of the flexible support plate;
   wherein the free section projects away from the shell when the slider moves toward the connecting portion.

2. The protective cover of claim 1, wherein the protrusion is formed with a recess.

3. The protective cover of claim 1, wherein the support assembly further comprises a guide member connecting the slider, the free section is formed with a guide slot, and the guide member is slidably connected to the guide slot.

4. The protective cover of claim 3, wherein the guide member is a bolt, and a threaded hole is formed in the slider for being screwed by the guide member.

5. The protective cover of claim 1, wherein the free section is an arc metal sheet.

* * * * *